United States Patent
Smith et al.

(10) Patent No.: US 9,933,088 B2
(45) Date of Patent: Apr. 3, 2018

(54) ROTARY ACTUATED VALVE WITH POSITION INDICATOR

(71) Applicant: Woodward, Inc., Fort Collins, CO (US)

(72) Inventors: Douglas Paul Smith, Roscoe, IL (US); Steven Charles Stumbo, Severance, CO (US); Aaron William Hrdlichka, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 30 days.

(21) Appl. No.: 14/735,826

(22) Filed: Jun. 10, 2015

(65) Prior Publication Data
US 2016/0363236 A1    Dec. 15, 2016

(51) Int. Cl.
*F16K 37/00*    (2006.01)
*F16K 31/12*    (2006.01)
(Continued)

(52) U.S. Cl.
CPC ........ *F16K 37/0041* (2013.01); *F16K 5/0689* (2013.01); *F16K 11/0876* (2013.01);
(Continued)

(58) Field of Classification Search
CPC .... F16K 37/0041; F16K 31/12; F16K 11/087; F16K 11/0873; F16K 11/0876;
(Continued)

(56) References Cited

U.S. PATENT DOCUMENTS 3,237,528 A  *  3/1966  Rose .................. F16K 31/12
                                                 91/409
3,935,754 A     2/1976  Comollo
                (Continued)

FOREIGN PATENT DOCUMENTS

WO          97/48026        12/1997

OTHER PUBLICATIONS

International Search Report and Written Opinion issued in International Application No. PCT/US2016/036353 dated Sep. 20, 2016; 13 pages.
(Continued)

*Primary Examiner* — Ian Paquette
(74) *Attorney, Agent, or Firm* — Fish & Richardson P.C.

(57) ABSTRACT

The subject matter of this specification can be embodied in, among other things, a positioning device that includes an actuator assembly configured to actuate an output shaft based on an input signal, and a position sensor assembly. The position sensor assembly includes a position sensor configured to detect a position of an input shaft not directly coupled to the output shaft, a first input receiver configured to receive the input signal, a first output transmitter configured to provide an output signal based on the position of the input shaft, and a second output transmitter configured to provide another output signal indicative of a failure of at least one of the input shaft and the output shaft. A moveable member is coupled to both the output shaft and the input shaft and is configured to alter the positional configuration of the input shaft and to be actuated by the output shaft.

21 Claims, 3 Drawing Sheets

(51) Int. Cl.
*F16K 31/122* (2006.01)
*F16K 5/06* (2006.01)
*F16K 11/087* (2006.01)
*F15B 15/12* (2006.01)
*F15B 15/14* (2006.01)

(52) U.S. Cl.
CPC ............ *F16K 31/12* (2013.01); *F16K 31/122* (2013.01); *F16K 37/0083* (2013.01); *F15B 15/12* (2013.01); *F15B 15/14* (2013.01)

(58) Field of Classification Search
CPC .. F16K 37/0083; F16K 5/0689; F16K 31/122; F15B 15/12; F15B 15/14
USPC .... 137/553, 554, 556; 251/62, 63.4, 129.11, 251/12, 13
See application file for complete search history.

(56) References Cited

U.S. PATENT DOCUMENTS

| | | |
|---|---|---|
| 4,578,993 A | 4/1986 | Burandt |
| 4,779,822 A | 10/1988 | Burandt et al. |
| 6,021,652 A | 2/2000 | Walker |
| 6,382,226 B1 | 5/2002 | Larson et al. |
| 6,880,567 B2 * | 4/2005 | Klaver .................... F16K 17/04 137/461 |
| 7,191,754 B2 * | 3/2007 | Keefover .............. F02D 9/1065 123/337 |
| 7,946,555 B2 * | 5/2011 | Ikeda ..................... F02D 9/105 251/129.11 |
| 2004/0129909 A1 * | 7/2004 | Wiese ................... F02D 11/106 251/129.04 |
| 2005/0028871 A1 | 2/2005 | Kurita |
| 2008/0087248 A1 * | 4/2008 | Saito ...................... F02D 9/107 123/337 |
| 2013/0313454 A1 * | 11/2013 | Stubbs ................. F16K 31/046 251/129.04 |

OTHER PUBLICATIONS

Written Opinion of the International Preliminary Examining Authority issued in Interantional Application No. PCT/US2016/036353 dated May 16, 2017; 7 pages.

International Preliminary Report on Patentability issued in International Application No. PCT/US2016/034353 dated Sep. 21, 2017; 18 pages.

* cited by examiner

ROTARY ACTUATED VALVE WITH POSITION INDICATOR

TECHNICAL FIELD

This instant specification relates to a valve device and more particularly to a rotary actuated valve having a mechanical valve position indicator.

BACKGROUND

Rotary hydraulic actuators of various forms are currently used in industrial mechanical power conversion applications. This industrial usage is common for applications where continuous inertial loading is desired without the need for load holding for long durations, e.g. hours, without the use of an external fluid power supply. Aircraft flight control applications generally implement loaded positional holding, for example, in a failure mitigation mode, using substantially only the blocked fluid column to hold position.

SUMMARY

In general, this document describes a rotary actuated valve having a mechanical valve position indicator.

In a first aspect, a positioning device includes an actuator assembly coupled to an output shaft and configured to actuate the output shaft based on an input signal, and a position sensor assembly. The position sensor assembly includes a position sensor configured to detect a positional configuration of an input shaft not directly coupled to the output shaft, a first input receiver configured to receive the input signal, a first output transmitter configured to provide a first output signal based on the positional configuration of the input shaft, and a second output transmitter configured to provide a second output signal indicative of a failure of at least one of the input shaft and the output shaft based on a comparison of the input signal and the positional configuration. A moveable member is coupled to both the output shaft and the input shaft and spaced apart from both the actuator assembly and the position sensor, the moveable member being configured to alter the positional configuration of the input shaft and being configured to be actuated by the output shaft.

Various embodiments can include some, all, or none of the following features. The input shaft and the output shaft be concentric. The device can include a housing arranged about the actuator assembly and the position sensor. The actuator assembly defines a cavity and the position sensor is arranged within the cavity. The device can include a valve assembly comprising a housing and a valve, wherein the moveable member is coupled to the valve. The actuator can be a rotary valve fluid actuator. The actuator can be a rotary vane fluid actuator.

In a second aspect, a positioning device includes a moveable member, an actuator assembly spaced apart from the moveable member and configured to alter a positional configuration of the moveable member, a position sensor spaced apart from the moveable member and configured to detect both a position of the moveable member and a failure of the actuator assembly to alter the positional configuration of the moveable member.

Various embodiments can include some, all, or none of the following features. The moveable member can be rotatably coupled to the actuator assembly by an input shaft, and the moveable member is rotatably coupled to the position sensor by an output shaft. The input shaft and the output shaft can be concentric. The device can include a housing arranged about the actuator assembly and the position sensor. The actuator assembly defines a cavity and the position sensor is arranged within the cavity. The device can include a valve assembly having a housing and a valve, wherein the moveable member is coupled to the valve. The actuator van be a rotary valve fluid actuator. The actuator can be a rotary vane fluid actuator.

In a third aspect, a method of operating a positioning device includes providing an actuator assembly coupled to an output shaft and configured to actuate the output shaft, providing a position sensor configured to detect the positional configuration of an input shaft, coupling the output shaft indirectly to the input shaft through a moveable member spaced apart from both the actuator assembly and the position sensor, the moveable member being configured to alter the positional configuration of the input shaft and being configured to be actuated by the output shaft, actuating the output shaft in response to an input signal, actuating, by the output shaft, the moveable member, altering, by the moveable member; the positional configuration of the input shaft, detecting, by the position sensor, the positional configuration of the input shaft; and providing a first output signal based on the detected positional configuration.

Various implementations can include some, all, or none of the following features. The method can include comparing the input signal to the first output signal, determining a positional error based on the input signal and the first output signal; and updating the input signal based on the positional error. The method can include determining that the positional error is greater than a threshold positional error limit, and providing a second output signal. The input shaft and the output shaft can be concentric. The actuator assembly defines a cavity and the position sensor is arranged within the cavity. The positioning device can include a valve assembly comprising a housing and a valve, wherein the moveable member is coupled to the valve.

The systems and techniques described herein may provide one or more of the following advantages. First, a system can provide an indication of valve position to a position sensor through a shaft that is connected to a positionable member and is separate from a drive shaft. Second, the system can provide failure detection for the drive shaft and linkage without additional means of position error detection (e.g., additional sensors, mechanical or electrical over-travel detection). Third, the system can use a primary position sensor to detect both valve position and linkage failure. Fourth, the system can be embodied in configurations that use rotary and/or linear actuators, and can use a feedback shaft that is directly connected to the position sensor and concentric with the drive shaft.

The details of one or more implementations are set forth in the accompanying drawings and the description below. Other features and advantages will be apparent from the description and drawings, and from the claims.

DETAILED DESCRIPTION

This document describes systems and techniques for positioning a valve device and more particularly to a rotary actuated valve having a mechanical valve position indicator. In general, a controllable actuator is located apart from a valve, and the actuator is coupled to a valve member by an output shaft. A position sensor is also located apart from the valve, and is coupled to the valve member by an input shaft. The actuator can apply torque to the output shaft to position the valve member, and movement of the valve member can apply torque to the input shaft to position the position sensor. In general, a mechanical position feedback loop is formed, which can be used for applications in which an actuator is located apart from a valve to provide feedback for one or both of position sensing and mechanical failure (e.g., of the output shaft).

Figure 1A:
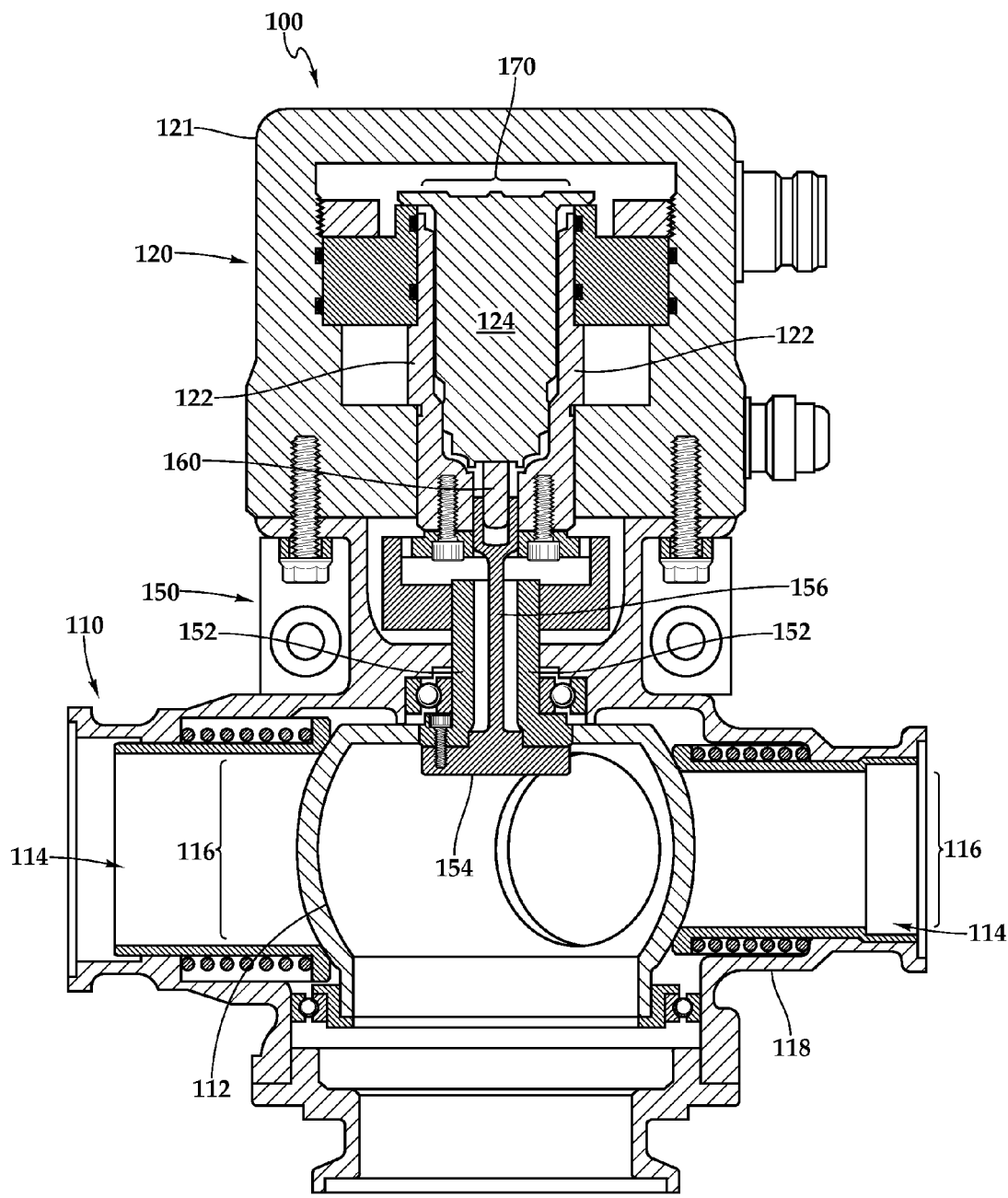
FIG. 1A is a diagram that shows a cross sectional view of an example of a positioning device.

FIG. 1A is a diagram that shows a cross sectional view of an example positioning device 100. The device 100 includes a fluid valve assembly 110. The fluid valve assembly 110 includes a positionable member 112 (e.g., valve member, disc) that can be moved to controllably obstruct a fluid path 114 (e.g., contact a valve seat) passing through a central bore 116 of a flow body (e.g., valve body) 118.

The positionable member 112 is configured to be moved by a controllable actuator assembly 120 linked to the positionable member 112 by a linkage assembly 150. In general, the actuator assembly 120 is located apart from the fluid valve assembly 110. For example, the actuator assembly 120 may be located remote from the fluid valve assembly 110 to accommodate design issues such as extreme temperatures near the fluid valve assembly 110, space constraints near the fluid valve assembly 110, accessibility issues (e.g., ease of maintenance), or other design considerations.

The actuator assembly 120 includes a housing 121, an actuator 122, and a position sensor 124. In the illustrated example, the actuator 122 is depicted as a rotary fluid actuator, such as a rotary vane actuator or a rotary piston actuator. In some embodiments, the actuator 122 can be any appropriate type of actuator that can provide a rotary mechanical output (e.g., an electrical actuator, stepper, servo).

In the illustrated example, the actuator 122 is removably coupled to an output shaft 152 of the linkage assembly 150. The output shaft 152 is configured to receive torque provided by the actuator 122 and transfer the torque to the positionable member 112 and a moveable member 154. The moveable member 154 is coupled to the positionable member 112. In some embodiments, the moveable member 154 may be removable from the positionable member 112. Rotary movement of the output shaft 152 urges rotary movement of the positionable member 112 and moveable member 154 within flow body 118, which can control the flow of fluid through the flow path 114.

The moveable member 154 is also coupled to an input shaft 156. The input shaft is configured to receive torque provided though the moveable member 154 and transfer the torque to a sensor shaft 160 of the position sensor 124. The position sensor 124 provides a position configuration signal 182 (see FIG. 1B) that can be measured to determine the rotary position of the sensor shaft 160. In the illustrated configuration, the position configuration signal 182 is representative of the position of the positionable member 112, as positioned by the moveable member 154 and fed back mechanically through the input shaft 156 to the sensor shaft 160.

In the illustrated example, the output shaft 152 is formed as a cylinder with the input shaft 156 passing coaxially through the interior bore of the output shaft 152. The output shaft 152 and the input shaft 156 are coupled substantially only at the moveable member 154. For example, torque may be applied to the output shaft 152 at an end opposite from the moveable member 154. The moveable member 154 couples the output shaft 152 to the input shaft 156, causing the input shaft 156 to rotate along with the output shaft 152. However, if either of the output shaft 152 or the input shaft 156 were to break or otherwise decouple, torque may no longer be transmitted from the distal end of the output shaft 152 to the moveable member 154 and back to the distal end of the input shaft 156. In some implementations, the rotational movement of the input shaft 156 (e.g., or components coupled thereto) can be compared to the rotational movement of the output shaft 152 (e.g., or components coupled thereto) to detect a breakage in the linkage assembly 150.

In some embodiments, the output shaft 152 and the input shaft 156 may not be coaxial to each other. For example, the output shaft 152 may be coupled to the positionable member 112 at a first axial end of the positionable member 112, and the input shaft 156 may be coupled to an opposite axial end of the positionable member 112 (e.g., with both the output shaft 152 and the input shaft 156 aligned along a common axis). In such a configuration, the position sensor 124 may be located apart from both the actuator assembly 120 and the fluid valve assembly 110, coupled to the positionable member 112 at a distance by the input shaft 156. In yet other embodiments, the output shaft 152 and the input shaft 156 may not be axially aligned. For example, the input shaft 156 may be rotated by torque provided by the output shaft 152 through a linkage or other coupling mechanism at or near the moveable member 154. In some embodiments, the input shaft 156, the output shaft 152, the moveable member 154, and/or other components of the device 100 can be made from corrosion-resistant steel, aluminum, composites, and combinations of these and any other materials that are appropriate for the environment and loading of the device 100.

Figure 1B:
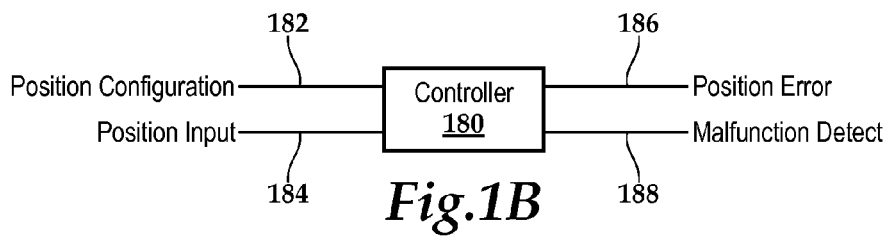
FIG. 1B is a block diagram of an example of a position controller.

Referring now to the example of a position controller shown in FIG. 1B, the position configuration signal 182 is processed by a position controller 180 as part of a feedback control loop. The position controller 180 compares the position configuration signal 182 to a position input signal 184 (e.g., the desired position of the positionable member 112) to provide a position error signal 186. In some implementations, the position error signal 186 can be used as part of a closed control feedback loop used to control the actuation of the actuator 122 and the positionable member 112.

The position controller 180 may also be configured to compare the difference between the position input signal 184 and the position configuration signal 182 as part of a fault detection process. For example, the position configuration signal 182 can be compared to the position input signal 184 to determine an error (e.g., difference, delta, provided as the position error signal 186) between the two signals. Under normal operating conditions, the sensor shaft 160 and the actuator 122 will rotate together since they are rotationally coupled together by the linkage assembly 150. However, in the event of a mechanical malfunction, such as a break in the output shaft 152, the sensor shaft 160 may become rotationally decoupled from the actuator 122. As such, changes in the position input signal 184 may not cause a corresponding change in the position configuration signal 182. The position input signal 184 and the position configuration signal 182 can be compared by the position controller 180, and when the position controller 180 detects that the two signals differ by more than a predetermined amount (e.g., about ten or twenty degrees), a malfunction detection signal 188 may be provided to signal that a malfunction may have occurred in the linkage assembly 150.

In the illustrated example, the position sensor 124 occupies a cavity 170 defined within the actuator assembly 120. The actuator 122 is able to rotate coaxially, but independent to, the rotation of the sensor input 160. In some embodiments, the position sensor 124 and the actuator 122 may not be arranged concentrically. An example of such a nonconcentric arrangement is discussed in the description of FIGS. 2A and 2B.

Figure 2A:
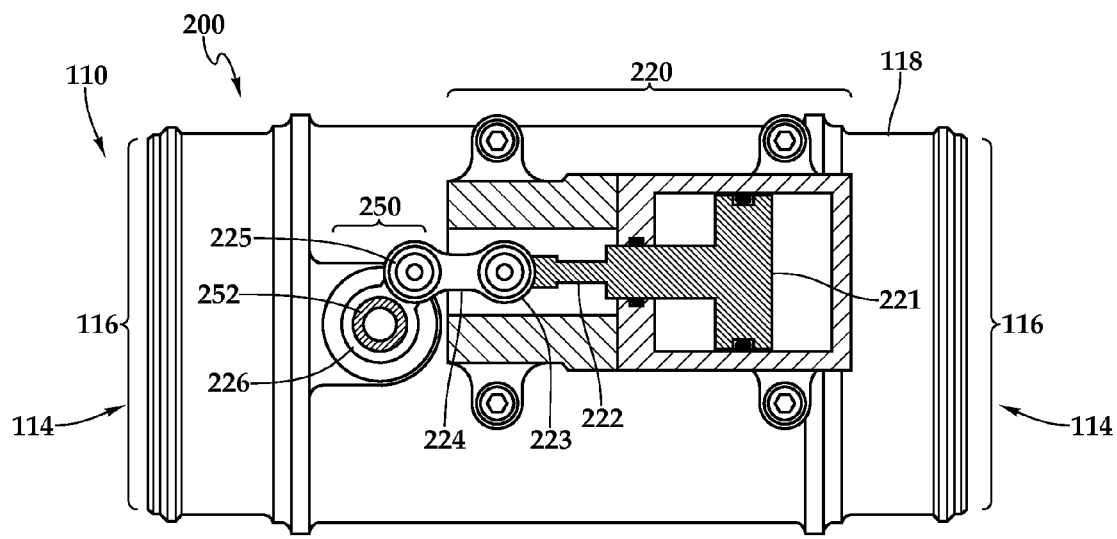
FIGS. 2A and 2B are diagrams that shows a top and cross sectional side view of another example of a positioning device.
Figure 2B:
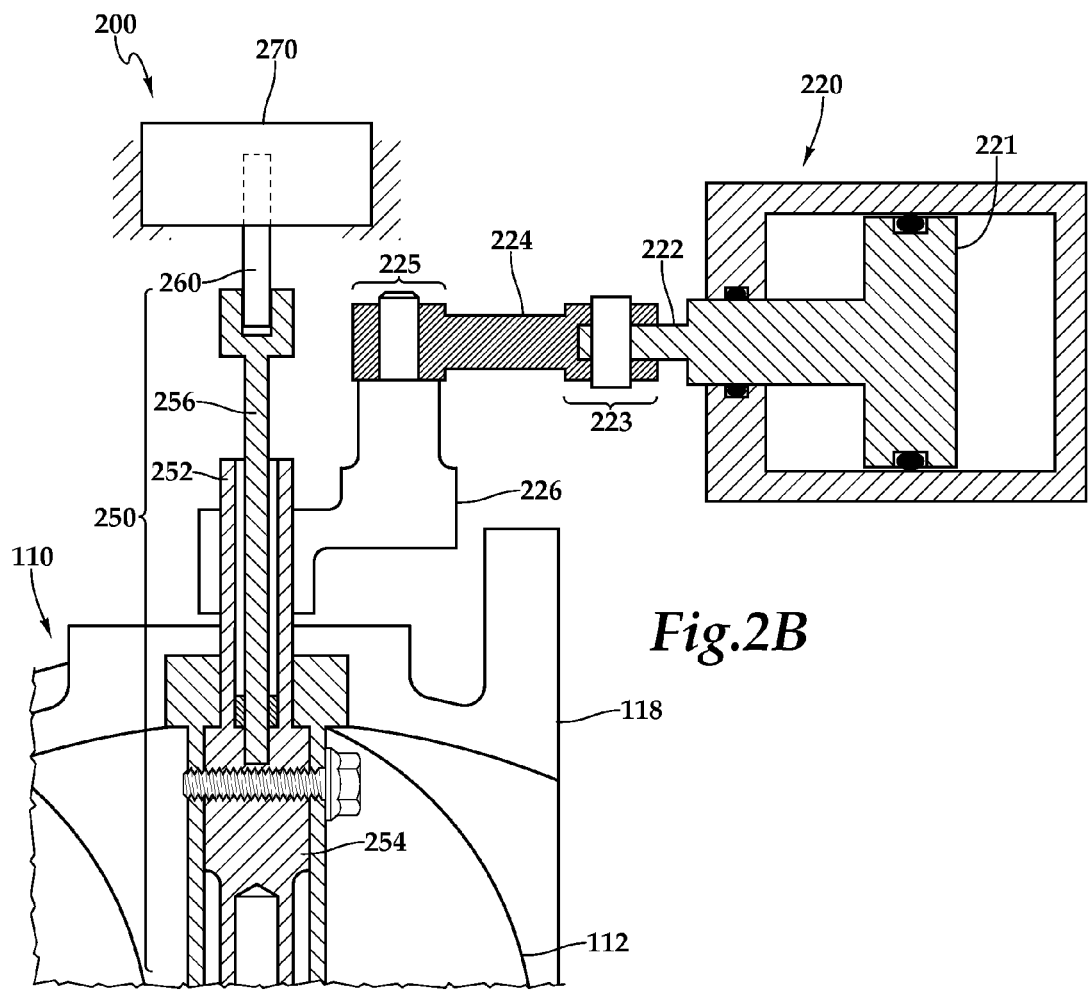

FIGS. 2A and 2B are diagrams that shows a top and cross sectional side view of another example of a positioning device 200. The positioning device 200 includes the fluid valve assembly 110 of FIG. 1A, with the positionable member 112 that can be moved to controllably obstruct the fluid path 114 passing through the central bore 116 of the flow body 118.

The positionable member 112 is configured to be moved by a controllable actuator assembly 220 linked to the positionable member 112 by a linkage assembly 250. In general, the actuator assembly 220 is located apart from the fluid valve assembly 110. For example, the actuator assembly 220 may be located remote from the fluid valve assembly 110 to accommodate design issues such as extreme temperatures near the fluid valve assembly 110, space constraints near the fluid valve assembly 110, accessibility issues (e.g., ease of maintenance), or other design considerations.

The actuator assembly 220 is a linear fluid actuator (e.g., hydraulic or pneumatic piston) that includes a piston 221 (shown in FIG. 2A) configured to urge linear movement of a piston rod 222. In some embodiments, other forms of linear actuators can be used in place of the actuator assembly 220, such as electric linear motors. The piston rod 222 is rotationally coupled to a crosshead bearing 223 and a connecting rod 224. A crank bearing 225 rotationally couples the connecting rod 224 to a crank arm 226. The crank arm is coupled to an output shaft 252 of a linkage assembly 250. Reciprocal movement of the piston 221 is transformed by the actuator assembly 220 into rotary motion of the output shaft 252.

Referring primarily now to FIG. 2B, the output shaft 252 transfers the rotary motion (e.g., torque) to the positionable member 112 and a moveable member 254. The moveable member 254 is coupled to the positionable member 112. In some embodiments, the moveable member 254 may be coupled to the positionable member 112 by brazing, welding, bolting, press fitting, or any other appropriate bond. In some embodiments, the moveable member 254 and the positionable member 112 may be formed from a unitary piece of material. Rotary movement of the moveable member 254 urges rotary movement of the positionable member 112 within flow body 118, which can control the flow of fluid through the flow path 114.

The moveable member 254 is also coupled to an input shaft 256. The input shaft is configured to receive torque provided though the moveable member 254 and transfer the torque to a sensor shaft 260 of a position sensor 270. The position sensor 270 provides a position configuration signal (not shown) (e.g., the position configuration signal 182) that can be measured to determine the rotary position of the sensor shaft 260. The position configuration signal is representative of the position of the positionable member 112, as positioned by the moveable member 254 and fed back through the input shaft 256 to the sensor shaft 260.

In the illustrated example, the output shaft 252 is formed as a cylinder, with the input shaft 256 passing coaxially through the interior bore of the output shaft 252. The output shaft 252 and the input shaft 256 are coupled substantially only at the moveable member 254. For example, torque may be applied to the output shaft 252 at an end opposite from the moveable member 254. The moveable member 254 couples the output shaft 252 to the input shaft 256, causing the input shaft 256 to rotate along with the output shaft 252. However, if the output shaft 252, the input shaft 256, or a component of the actuator assembly 220 were to break or otherwise decouple, torque may no longer be transmitted from the piston 221, to the distal end of the output shaft 252, to the moveable member 254, and back to the distal end of the input shaft 256. In some implementations, a position controller such as the position controller 180 of FIG. 1B can compare the rotational movement of the input shaft 256 (e.g., or components coupled thereto) to the rotational movement of the output shaft 252 (e.g., or the actuator assembly 220 or to components coupled thereto) to detect a breakage in the linkage assembly 250.

In some embodiments, the output shaft 252 and the input shaft 256 may not be coaxial to each other. For example, the input shaft 256 may be rotationally coupled to the output shaft 252 by a linkage or other coupling mechanism located in proximity to the moveable member 254.

In some embodiments, the position configuration signal can be processed by the position controller 180 of FIG. 1B as part of a feedback control loop. For example, the position configuration signal 182 can be compared to the position input signal 184 to form a portion of a closed control feedback loop used to control the actuation of the piston 221 and the positionable member 112.

In some embodiments, the position configuration signal 182 can be processed by the position controller 180 as part of a fault detection process. For example, the position configuration signal 182 can be compared to the position input signal 184 to determine an error (e.g., difference, delta) between the two signals. Under normal operating conditions, the sensor shaft 260 and the piston 221 will move proportionally together since they are coupled together by the actuator assembly 220 and the linkage assembly 250. However, in the event of a mechanical malfunction, such as a break in the piston 221, the piston rod 222, the crosshead bearing 223, the connecting rod 224, the crank bearing 225, the crank arm 226, the moveable member 254, or the output shaft 252, the sensor shaft 260 may become rotationally decoupled from the actuator assembly 220. As such, changes in the position input signal 184 may not cause a corresponding change in the position configuration signal 182. The position input signal 184 and the position configuration signal 182 can be compared by the position controller 180, and when the two signals differ by more than a predetermined amount a malfunction in the actuator assembly 220 and/or the linkage assembly 250 will be detected and indicated by the malfunction detection signal 188.

Figure 3:
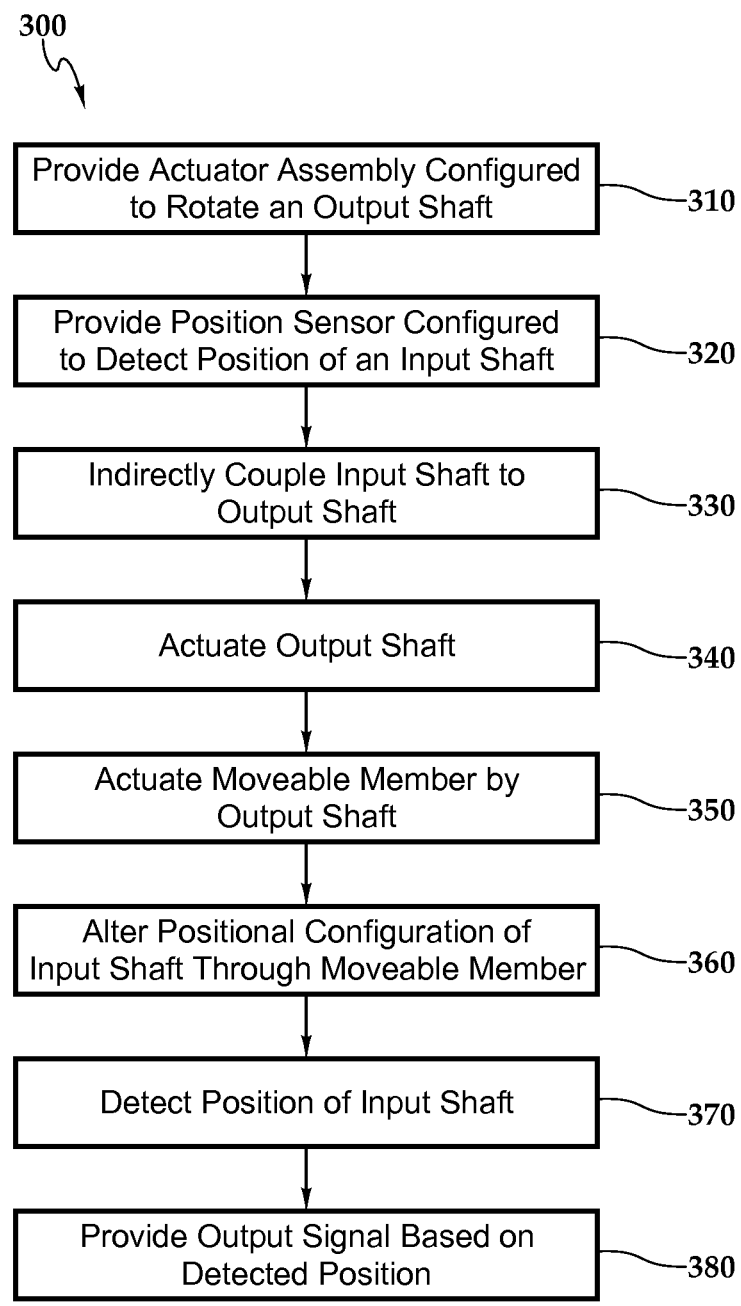
FIG. 3 is flow chart that shows an example of a process for operating a positioning device.

FIG. 3 is flow chart that shows an example of a process 300 for operating a positioning device. In some implementations, the process 300 can be performed using the positioning device 100 of FIG. 1A, the positioning device 200 of FIGS. 2A-2B, the position controller 180 of FIG. 1B, and/or other devices configured to process information gathered from the positioning devices 100 or 200.

At 310, an actuator assembly is provided. The actuator assembly is coupled to an output shaft and configured to actuate the output shaft. For example, the actuator 122 is coupled to the output shaft 152. The actuator 122 is configured to urge rotation of the output shaft 152.

At 320, a position sensor is provided. The position sensor is configured to detect the positional configuration of an input shaft. For example, the position sensor 124 is configured to detect the rotational position of the sensor input 160. The position sensor 124 is coupled to the input shaft 156 at the sensor input 160. Rotation of the input shaft 156 rotates the sensor input 160 such that the position sensor 124 can detect the rotational position of the input shaft 156.

In some embodiments, the input shaft and the output shaft can be concentric. For example, the input shaft 156 is configured as a rod that passes through a cylindrical bore that extends axially through the interior of the output shaft 152. In some embodiments, the output shaft 152 may configured as a rod passing coaxially within a cylindrical bore formed within the input shaft 156.

At 330, the output shaft is coupled indirectly to the input shaft through a moveable member spaced apart from both the actuator assembly and the position sensor, the moveable member being configured to alter the positional configuration of the input shaft and being configured to be actuated by the output shaft. For example, the output shaft 152 is coupled to the input shaft 156 through the moveable member 154. The moveable member 154 is located proximal to one axial end of the linkage assembly 150, spaced apart from the opposite axial end of the linkage assembly 150 where the actuator 122 is coupled to the output shaft 152 and the position sensor 124 is coupled to the input shaft 156.

At 340, the output shaft is actuated in response to an input signal. In some embodiments, the input signal can be the position input 184. In some embodiments, the output shaft 152 can be actuated in response to a fluidic pressure applied to the actuator 122 (e.g., a fluidic input signal). In some embodiments, the actuator 122 may be actuated by fluid pressure provided by a valve or pump in response to a control signal (e.g., an electrical input signal).

At 350 the moveable member is actuated by the output shaft. For example, the output shaft 152 can transfer torque to the moveable member 154.

At 360, the positional configuration of the input shaft is altered by the moveable member. For example, the output shaft 152 is coupled to the input shaft 156 through the moveable member 154. Rotation of the moveable member 154 applies torque to the input shaft 156.

At 370, the position sensor detects the positional configuration of the input shaft. For example, the position sensor 124 can detect the rotary position of the sensor input 160 which is rotationally coupled to the input shaft 156.

At 380, a first output signal based on the detected positional configuration is provided. For example, the position sensor 124 can provide the position configuration signal 182 as an electrical or other signal that represents the rotary position of the input shaft 156.

In some implementations, the input signal and the first output signal can be compared, a positional error can be determined based on the input signal and the first output signal, and the input signal can be updated based on the positional error. For example, the linkage assembly 150 can provide a mechanical feedback loop that drives the position sensor 124 to determine the position error signal 186. The position error signal 186 can be used as a feedback signal in a closed control feedback loop. For example, a closed loop position controller can use the position error signal 186 to determine an error between a desired position of the positionable member 112 and an actual position of the positional member 112 and alter an actuation signal to the actuator 122 (e.g., the position input signal 184) in an effort to compensate for the detected positional error.

In some implementations, the positional error may be determined as being greater than a threshold positional error limit, and a second output signal may be provided. For example, relatively minor positional errors (e.g., less than about ten or twenty degrees) may be used by the a controller as part of a closed loop positional control scheme, while detection of relatively larger positional errors (e.g., greater than about ten or twenty degrees) by the position controller 180 may trigger the malfunction detection signal 188 to indicate the detection of a possible mechanical malfunction within the linkage assembly 150 or another component of the positioning device 100.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A positioning device comprising:
    an actuator assembly coupled to a first axial end of an output shaft and configured to actuate the output shaft based on an input signal;
    a position sensor assembly comprising:
        a position sensor configured to detect a positional configuration of a second axial end of an input shaft proximal the first axial end and not directly coupled to the output shaft;
        a first input receiver configured to receive the input signal;
        a first output transmitter configured to provide a first output signal based on the positional configuration of the input shaft; and
        a second output transmitter configured to provide a second output signal indicative of a failure of at least one of the input shaft and the output shaft based on a comparison of the input signal and the positional configuration;
    a moveable member coupled to both the output shaft, at a third axial end opposite the first axial end, and the input shaft, at a fourth axial end opposite the second axial end, and spaced apart from both the actuator assembly and the position sensor, the moveable member being configured to alter the positional configuration of the input shaft and being configured to be actuated by the output shaft.

2. The device of claim 1, wherein the input shaft and the output shaft are concentric.

3. The device of claim 1, further comprising a housing arranged about the actuator assembly and the position sensor.

4. The device of claim 1, wherein the actuator assembly defines a cavity and the position sensor is arranged within the cavity.

5. The device of claim 1, further comprising a valve assembly comprising a housing and a valve, wherein the moveable member is coupled to the valve.

6. The device of claim 1, wherein the actuator is a rotary valve fluid actuator.

7. The device of claim 1, wherein the actuator is a rotary vane fluid actuator.

8. A positioning device comprising:
a moveable member coupled to a first shaft and a second shaft not directly coupled to the first shaft;
an actuator assembly spaced apart from the moveable member and coupled to the first shaft, wherein the first shaft is configured to alter a positional configuration of the moveable member based on an input signal;
a position sensor spaced apart from the moveable member and coupled to the second shaft, configured to detect a positional configuration of the second shaft, wherein the moveable member is configured to alter the positional configuration of the second shaft based on the positional configuration of the moveable member;
a first output configured to provide a first output signal based on the positional configuration of the second shaft; and
a second output configured to provide a second output signal indicative of a failure of the actuator assembly to alter the positional configuration of the second shaft through the moveable member, based on a comparison of the input signal and the positional configuration.

9. The device of claim 8, further comprising a housing arranged about the actuator assembly and the position sensor.

10. The device of claim 8, wherein the actuator assembly defines a cavity and the position sensor is arranged within the cavity.

11. The device of claim 8, further comprising a valve assembly comprising a housing and a valve, wherein the moveable member is coupled to the valve.

12. The device of claim 8, wherein the actuator is a rotary valve fluid actuator.

13. The device of claim 8, wherein the actuator is a rotary vane fluid actuator.

14. The device of claim 8, wherein the first shaft is an input shaft that is rotatably coupled to the actuator assembly and the moveable member, and the second shaft is an output shaft that is rotatably coupled to the position sensor and the moveable member.

15. The device of claim 14, wherein the input shaft and the output shaft are concentric.

16. A method of operating a positioning device, the method comprising:
providing an actuator assembly coupled to a first axial end of an output shaft and configured to actuate the output shaft;
providing a position sensor configured to detect the positional configuration of a second axial end of an input shaft proximal the first axial end;
coupling a third axial end the output shaft, opposite the first axial end, indirectly to the input shaft at a fourth axial end of the output shaft opposite the second axial end through a moveable member spaced apart from both the actuator assembly and the position sensor, the moveable member being configured to alter the positional configuration of the input shaft and being configured to be actuated by the output shaft;
actuating the output shaft in response to an input signal;
actuating, by the output shaft, the moveable member;
altering, by the moveable member, the positional configuration of the input shaft;
detecting, by the position sensor, the positional configuration of the input shaft; and
providing a first output signal based on the detected positional configuration.

17. The method of claim 16, wherein the input shaft and the output shaft are concentric.

18. The method of claim 16, wherein the actuator assembly defines a cavity and the position sensor is arranged within the cavity.

19. The method of claim 16, wherein the positioning device further comprises a valve assembly comprising a housing and a valve, wherein the moveable member is coupled to the valve.

20. The method of claim 16, further comprising:
comparing the input signal to the first output signal;
determining a positional error based on the input signal and the first output signal; and
updating the input signal based on the positional error.

21. The method of claim 20, further comprising:
determining that the positional error is greater than a threshold positional error limit; and
providing a second output signal.

* * * * *